United States Patent Office 3,682,900
Patented Aug. 8, 1972

3,682,900
STILBENE DERIVATIVES
Peter Liechti, Binningen, Erwin Maeder, Aesch, Basel-Land, Leonardo Guglielmetti, Birsfelden, and Adolf Emil Siegrist, Basel, Switzerland, assignors to Ciba-Geigy AG, Basel, Switzerland
No Drawing. Continuation-in-part of application Ser. No. 580,592, Sept. 20, 1966. This application Apr. 21, 1969, Ser. No. 818,131
Claims priority, application Switzerland, Sept. 27, 1965, 13,277/65
Int. Cl. C07d 85/48
U.S. Cl. 260—240 CA            3 Claims

ABSTRACT OF THE DISCLOSURE

New stilbene derivatives of the formula

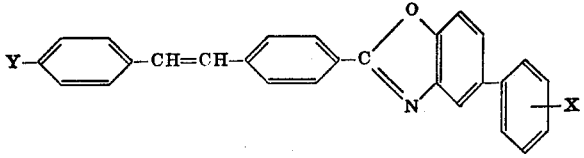

in which X represents a member selected from the group consisting of a sulphonic acid group, a water-soluble salt of the sulphonic acid group and a sulphonamide group, and Y represents a member selected from the group consisting of a carboxylic acid group and a water-soluble salt of the carboxylic acid group. The compounds of the present invention are optical brighteners which are especially useful in washing agents for organic fibrous materials.

CROSS-REFERENCE TO RELATED APPLICATION

This is a continuation-in-part application of our application Ser. No. 580,592, filed Sept. 20, 1966, now abandoned.

The present invention provides new stilbene derivatives and processes for their use for organic fibrous substrates, especially for washing agents or in washing operations.

The new stilbene derivatives correspond to the formula (1)
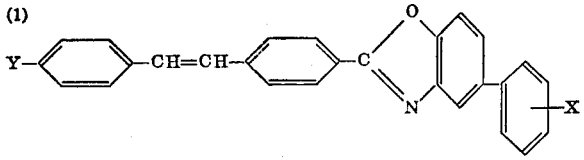

in which X represents a sulphonic acid group in the form of the free sulphonic acid or of a water-soluble salt thereof, or a sulphonamide group, and Y represents a carboxylic acid group in the form of a free carboxyl group or of a water-soluble salt thereof. The water-soluble salts of the sulphonic acid group and carboxyl group are above all the alkali metal, ammonium, amine and alkanolamine salts. The parent compound of the present invention, that is to say the free acid, thus corresponds to the formula (2)
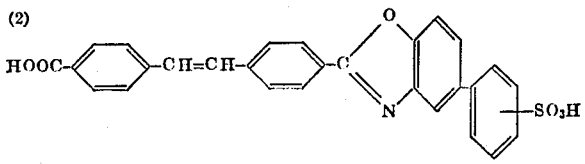

While 4-[5″-phenyl-benzoxazolyl-(2″)]-stilbenes having an optical brightening effect have already been described, these compounds have invariably been found to be at best only little suitable as brighteners for washing agents.

It has now been found that from among the large variety of phenyl-benzoxazolyl-stilbenes a specific type of compounds, namely those of the above Formula 1, are more suitable than similarly constituted compounds for use as brighteners for washing agents, that is to say as additives to washing agents which in the form of such combinations have a brightening effect on the material washed. Accordingly, the present invention provides simultaneously a process for optically brightening organic fibrous substrates, wherein the said fibrous substrates are washed with washing agents containing an optical brightener of the Formula 1.

As used in this context the term washing agent is intended to include quite generally any liquid or solid cleaning agent conventionally used for cleaning above all fibrous substrates of the most widely varying kinds, in most cases in an aqueous medium. As relevant examples there may be mentioned soaps, salts of sulphonate washing agents, for example of sulphonated benzimidazoles substituted on the C-2 atom by a higher alkyl radical, also salts of monocarboxylic acid esters of 4-sulphophthalic acid with higher fatty alcohols, salts of fatty alcohol sulphonates, alkylarylsulphonic acids or condensation products of higher fatty acids with aliphatic hydroxysulphonic or aminosulphonic acids, nonionic washing agents such as polyglycolethers derived from ethylene oxide and higher fatty alcohols, alkylphenols or fatty amines.

As shown above the term cleaning agent includes not only washing agents in the narrow sense but also so-called rinsing agents since they are in the closest functional connection with the washing agents proper and are generally used in combination with the latter to achieve the desired aim.

The stilbene derivatives to be used according to this invention may be combined with the washing agents in a variety of ways. For example, the brightener may be added to the wash liquor separately, though it is often more advantageous to use washing agents in which the brightener is already homogeneously dispersed. The homogeneous dispersion of these brighteners in the washing agent may be carried out by the usual mixing techniques, inter alia by the spray drying method.

The amount of brightener to be incorporated with the washing agent may vary within wide limits since it can and should be adapted to a large extent to the individual requirements, that is to say depending on the desired or required brightening effect produced on the washed material, on the working concentration of the washing agent and the like. It is advantageous to select a brightener content such that the wash liquor contains per litre 0.0005 to 0.1 g., preferably from 0.002 to 0.04 g., of the brightener. In special cases it is, of course, possible to use more or less than these amounts. With the conventional washing agents the above-mentioned concentrations of the wash liquor are in general achieved by adding to the washing agent 0.01 to 1.0, preferably 0.03 to 0.5, percent by weight of a brightener of the General Formula 1.

Organic materials that can be washed with the aforementioned washing agents or combinations of washing agents are above all organic fibrous substrates which may be of a textile or non-textile nature being, for example, continuous filaments, staple fibres, flocks, hanks, yarns, doubled yarns, fibre fleeces, felts, paddings, flocculated materials, textile fabrics, knitwear, textile laminates, or paper pulps, papers, pelts or the like.

Insofar as their chemical nature is concerned these fibrous substrates may have a widely differing structure; they may be fibres of natural origin, such as cellulose, wool, cotton, silk or hemp; or modified natural substances, for example cellulose esters or mixed esters or ethers, nitrocellulose, viscose rayon, cuprammonium cellulose, casein fibres and the like. Likewise suitable are synthetic fibres such, for example, as poly-α-olefines (polypropylene), polyvinyl chloride and polyvinylidene chloride, polyamides (poly-hexamethylenediamine adipate, polycaprolactam), polyurethanes, polyesters (especially saturated aromatic types such as polyethylene terephthalate) and the like.

For the washing operation a neutral, alkaline or acid, preferably a neutral to weakly alkaline, bath may be used. Washing may be performed at a temperature ranging from room temperature to the boiling temperature of water (or above 100° C. when washing under pressure); the wash liquor has advantageously a temperature from 40 to 95° C. Such washing may be performed in the presence of further auxiliaries of a different kind, for example complex formers (imino-diacetic acid, nitrilo-triacetic acid), shading dyestuffs (for example Polar Brilliant Blue), anti-boiling agents (for example benztriazole, 2-mercaptothiazoline), anti-corrosives, stabilizers (for example phosphates), agents for producing a soft handle and the like.

As will be realized from the foregoing it is, of course, also possible to add the brighteners of this invention to a rinsing agent, or in the course of the rinsing operation, instead of adding it to the washing agent proper, whereby the identical effect is achieved.

The stilbene derivatives to be used in the present invention display a sufficient solubility in water combined with an excellent brightening power, that is to say the specific kind, number and placement of the groups imparting solubility in water within the molecule cause not only solubility in water but ensure above all a favourable absorption spectrum. Moreover the compounds here concerned display the stability towards chlorine, acids and light of which a specially high degree must be demanded from brighteners for washing agents.

It has proved particularly valuable to use the brighteners of this invention for washing agents or washing operations for cotton in view of the considerable stability towards chlorine combined with their particularly good brightening power and fastness to light for this kind of substrate.

The stilbene compounds of the Formula 1 are obtained when a corresponding carboxylic acid of the formula (3)

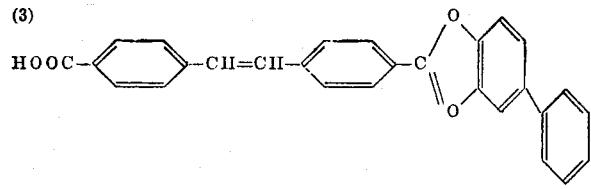

or a functional derivative (for example ester, amide, nitrile) thereof is treated with a sulphonating agent, for example highly concentrated sulphuric acid (commercial, so-called concentrated sulphuric acid) oleum, chlorosulphonating agents, followed by hydrolysis or possibly amination. Depending on the sulphonating agent used the reaction temperature may range from −20 to 100° C. It is also possible to perform the sulphonation in an inert solvent.

The carboxylic acids of the Formula 3 to be used as starting materials can be prepared by known processes, advantageously by condensing a stilbene dicarboxylic acid semiester of the formula (4)

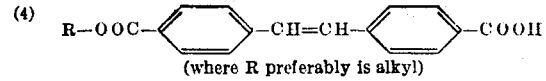

(where R preferably is alkyl)

or a derivative of the still free carboxyl group with a 2-amino-4-phenylphenol and synthesizing the oxazole ring on the primary condensation product by one of the conventional cyclization reactions. While it is in principle possible to hydrolyze the carboxylic acid ester grouping in position 4 relatively to the stilbene double bond separately, it is more advantageous to carry this out in a single stage together with the sulphonation with, for example, concentrated sulphuric acid.

EXAMPLE 1

22.2 grams of the compound of the formula (5)

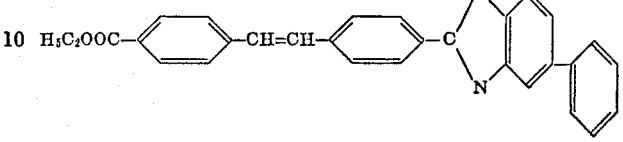

in 200 ml. of sulphuric acid of 98% strength are stirred for 50 minutes at 50° C. The viscous solution is then cooled to 0° C., dropped into 1 litre of ice-water, and the yellow precipitate is suctioned off, washed with concentrated hydrochloric acid to remove the adhering sulphuric acid and then dried under vacuum at 90° C. until its weight remains constant. There are obtained 23.2 g. of the compound of the formula (2)

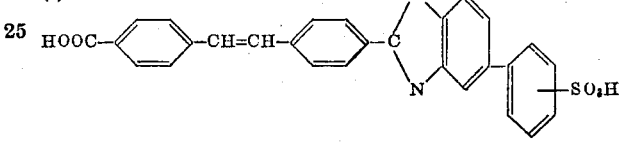

in the form of a yellow powder which reveals the following analytical data (the sulphonic acid group probably in p-position).

$C_{28}H_{19}O_6NS$: Calculated (percent): C, 67.60; H, 3.85; N, 2.82; O, 6.44. Found (percent): C, 66.8; H, 3.9; N, 2.9; O, 6.5.

UV-absorption (in dimethylformamide-water 1:1): $\lambda_{max}$ 363 mm./$\epsilon$ 72,000.

When in the procedure described above the ethyl ester of the starting material is replaced by another of its esters, for example the isopropyl ester, the identical sulphonic acid results.

The compound used as starting material is accessible from stilbene-4,4′-dicarboxylic acid monoethyl ester by condensation with 2-amino-4-phenylphenol in the known manner.

The product forms light-yellow crystals melting at 277 to 278° C.

$C_{30}H_{23}O_3N$: Calculated (percent): C, 80.88; H, 5.20; N, 3.14. Found (percent): C, 80.62; H, 5.10; N, 3.32.

When the sulphocarboxylic acid is neutralized with ammonia or an amine, for example triethanolamine, it forms readily water-soluble, almost colourless salts. When it is neutralized with an alkali or alkaline earth metal hydroxide, carbonate or bicarbonate, or by salting out from the solutions of the amine salts with a salt, for example the chloride, of an alkali or alkaline earth metal, there are obtained sparingly water-soluble alkali or alkaline earth metal salts, for example sodium, potassium or calcium salts, in the form of almost colourless powders.

EXAMPLE 2

A bleached cotton fabric is washed for 30 minutes at 60° C., at a goods-to-liquor ratio 1:30, in a liquor containing per litre:

0.016 g. of the brightener of Formula 2
1 g. of active chlorine (Javelle water)
4 g. of washing powder consisting of
    15% of dodecylbenzenesulphonate
    15% of sodium laurylsulphate
    35% of sodium tripolyphosphate
    28% of Glauber's salt, calcined
    5% of sodium metasilicate and
    2% of carboxymethylcellulose.

After rinsing and drying the fabric it displays a very strong brightening effect which is fast to light, acids and chlorine.

Identical results are obtained when the brightener of the Formula 2 is used in the form of an ammonium or alkali metal salt.

EXAMPLE 3

A bleached cotton fabric is treated at a good-to-liquor ratio of 1:30 for one hour at 20° C. in a bath which has been adjusted with Javelle water to an active chlorine content of 2 grams per litre and to a pH value of 11 and contains 0.01% of the brightener of the Formula 2, referred to the weight of the fabric. After having been rinsed and dried, the fabric displays a brightening effect having good fastness properties which is even superior to that obtained without Javelle water under otherwise identical conditions. When twice the amount of brightener is used, the brightening effect is intensified somewhat.

EXAMPLE 4

A bleached cotton fabric is treated at a goods-to-liquor ratio of 1:50 for 60 minutes at 80° C. in a bath which contains per litre 2.5 g. of sodium chloride and 0.1 g. of acid sodium pyrophosphate and, referred to the fabric weight, 0.025% of the brightener of the Formula 2 and has been adjusted with formic acid to a pH value of 3.5. After having been rinsed and dried the fabric displays a very strong brightening effect which can be intensified somewhat by using twice the quantity of brightener.

A polyamide fabric, for example Perlon-Helanca, is likewise very strongly brightened under identical conditions in the bath described above.

EXAMPLE 5

A polyamide fibre fabric (nylon) is treated at a goods-to-liquor ratio of 1:40 at 60° C. in a bath which contains (referred to the fabric weight) 0.2% of the brightener of the Formula 2 and 0.5 ml. per litre of acetic acid of 80% strength. The whole is raised within 20 minutes to the boil and kept boiling for 40 minutes. After rinsing and drying a very strong brightening effect is achieved which has very good fastness to light.

EXAMPLE 6

Cotton is washed at a goods-to-liquor ratio of 1:40 at 60 to 65° C. in a bath which contains per litre 10 g. of a washing agent of the following composition:

33.3 % of soap
11.0 % of anhydrous sodium carbonate
14.0 % of sodium pyrophosphate
7.0 % of sodium perborate
3.0 % of magnesium silicate
0.04% of the compound of the Formula 2 and
31.66% of water
———
100%

The cotton is then rinsed and dried. The cotton treated in this manner displays an outstanding white effect of good fastness to chlorine, acids and light. When the bath further contains a chlorine donor, the brightening effect achieved is by no means impaired.

EXAMPLE 7

An aqueous suspension of bleached sulphite cellulose (ground to 40° according to Schopper-Riegel) and 10% of kaolin (referred to the cellulose) is mixed with 0.05% (referred to the cellulose) of the compound of the Formula 2 in the form of an aqueous solution of 0.5% strength of the triethanolamine salt. Paper manufactured from this pulp in the usual maner displays a very strong optical brightening effect.

We claim:
1. A stilbene derivative of the formula

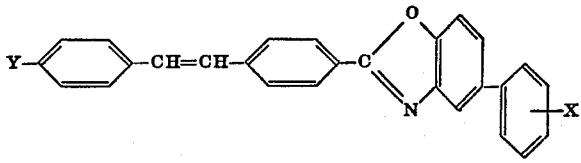

in which X represents a member selected from the group consisting of a sulphonic acid group, a water-soluble salt of the sulphonic acid group and a sulphonamide group, and Y represents a member selected from the group consisting of a carboxylic acid group and a water-soluble salt of the carboxylic acid group.

2. The compounds according to claim 1 which corresponds to the formula

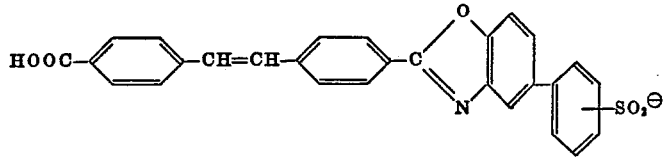

in the form of a member selected from the group consisting of the free acid, an alkali metal, ammonium, amine and an alkanolamine salt thereof.

3. The compound according to claim 2 having the formula

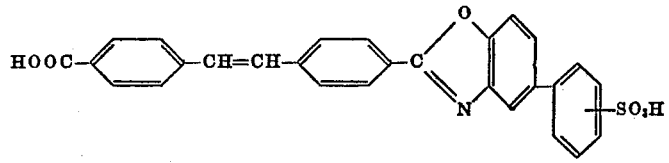

References Cited
UNITED STATES PATENTS 3,133,916   5/1964   Duennenberger et al. _ 260—240
3,577,411   5/1971   Liechti et al. _____ 260—240 CA

FOREIGN PATENTS 1,378,455  10/1964   France _____ 260—240
   90,874   1/1968   France _____ 260—240

(Addition to main Pat. 1,293,281)

JOHN D. RANDOLPH, Primary Examiner

U.S. Cl. X.R.

106—148, 176; 117—33.5 T; 252—94, 110, 146, 301.2 W, 524, 543; 260—471

Disclaimer 3,682,900.—*Peter Liechti*, Binningen, *Erwin Maeder*, Aesch, Basel-Land, *Leonardo Guglielmetti*, Birsfelden, and *Adolf Emil Siegrist*, Basel, Switzerland. STILBENE DERIVATIVES. Patent dated Aug. 8, 1972. Disclaimer filed Dec. 20, 1971, by the assignee, *Ciba-Geigy A.G.*

Hereby disclaims the portion of the term of the patent subsequent to May 4, 1988.

[*Official Gazette September 11, 1973.*]